United States Patent
Aikawa et al.

(10) Patent No.: US 6,435,702 B1
(45) Date of Patent: Aug. 20, 2002

(54) VEHICLE LAMP LENS WITH SURFACE TREATMENTS

(75) Inventors: Shinji Aikawa; Koichi Nakamura, both of Shizuoka (JP)

(73) Assignee: Koito Manufacturing Co., Inc., Tokyo (JP)

( * ) Notice: Subject to any disclaimer, the term of this patent is extended or adjusted under 35 U.S.C. 154(b) by 0 days.

(21) Appl. No.: 09/464,185

(22) Filed: Dec. 16, 1999

(30) Foreign Application Priority Data

Dec. 17, 1998 (JP) ........................................... 10-359004

(51) Int. Cl.⁷ .............................. B05D 5/06; B60Q 1/00
(52) U.S. Cl. ...................... 362/509; 362/311; 362/267; 427/164; 427/389.7
(58) Field of Search ................................ 362/509, 510, 362/351, 311, 267, 310, 546; 428/423.1, 411.1, 447, 448, 451, 500, 502, 524, 690, 913; 427/162, 164, 389.7

(56) References Cited

U.S. PATENT DOCUMENTS

| | | | |
|---|---|---|---|
| 4,101,513 A | * | 7/1978 | Fox et al. |
| 4,708,908 A | | 11/1987 | Tateoka et al. |
| 5,922,459 A | * | 7/1999 | Huang et al. ............... 428/349 |
| 5,985,420 A | * | 11/1999 | Haga et al. .................. 428/212 |
| 5,989,628 A | | 11/1999 | Haga et al. |
| 6,059,434 A | | 5/2000 | Murakoshi et al. |

FOREIGN PATENT DOCUMENTS

| | | |
|---|---|---|
| CN | 1187599 | 5/2000 |
| EP | 0 892 209 A2 | 1/1999 |
| GB | 1 260 948 | 1/1972 |
| GB | 2 006 945 A | 5/1979 |
| GB | 2 077 738 A | 12/1981 |
| JP | 9230109 | 9/1997 |
| JP | 10-158420 | 6/1998 |
| JP | 10-172306 | 6/1998 |

OTHER PUBLICATIONS

English Language Abstract of Japanese Appln. No. 9–230109.
Office Action from foreign patent office, dated Feb. 8, 2002 of corresponding Chinese Application No. 99126401.0.

* cited by examiner

Primary Examiner—Thomas M. Sember
(74) Attorney, Agent, or Firm—Fish & Richardson P.C.

(57) ABSTRACT

A vehicle lamp comprising a lens that includes an inner surface on which an antifogging coating film is formed and an outer surface on which a hard coating film is formed. It is preferable that the vehicle lamp further comprise a lamp body, wherein the lens further includes a lens front portion, a peripheral wall portion formed at the outer peripheral edge of the lens front portion, and a seal leg portion formed at the leading end of the peripheral wall portion and fixed to the lamp body, and wherein the antifogging coating film and the hard coating film are formed on at least the lens front portion excluding the seal the leg portion of the lens.

13 Claims, 4 Drawing Sheets

VEHICLE LAMP LENS WITH SURFACE TREATMENTS

BACKGROUND OF THE INVENTION

1. Field of the Invention

This invention relates to a vehicle lamp having a plastic lens and more particularly to the surface formation of the lens.

2. Description of the Related Art

Transparent lenses or equivalents are now employed in vehicle lamps such as headlamps. However, such a lens becomes fogged with only a few waterdrops sticking onto its inner surface and this poses a problem in view of its external appearance as quality. Consequently, it has heretofore been contrived to adopt a lens whose inner surface is coated with an antifogging coating film.

In recent years, plastic lenses are increasingly adopted in vehicle lamps such as headlamps. This is because the plastic lenses are lightweight and excellent in shock resistance in comparison with glass lenses. However, the following problem will be posed when it is attempted to form an antifogging coating film on the inner surface of such a plastic lens.

More specifically, though a backing jig 6 for supporting a lens 4 is used as shown in FIG. 4 when an antifogging coating film 2 is formed, there develops a problem arising from the possibility that the backing jig 6 may come in contact with the outer surface 4a of the lens 4, thus scratching the lens 4.

SUMMARY OF THE INVENTION

An object of the present invention made in view of the aforementioned situation is to provide a vehicle lamp so that the outer surface of a lens may be prevented from being damaged when an antifogging coating film is formed on the outer surface thereof even in a case where a plastic lens with the antifogging coating film formed on the inner surface thereof is adopted.

The present invention is intended to the object above by arranging a lens so that a hard coating film is formed on the outer surface of the lens.

The present invention is characterized in that in a vehicle lamp having a plastic lens, wherein an antifogging coating film is formed on the inner surface of the lens; and a hard coating film is formed on the outer surface of the lens.

The range of forming the "antifogging coating film" on the inner surface of the lens may cover the whole or part of the inner surface on condition that the range covers an area where a fogging problem is raised.

The range of forming a "hard coating film" on the outer surface of the lens may cover the whole or part of the outer surface on condition that the range covers an area where a scratching problem is raised.

As shown in the arrangement above, the vehicle lamp according to the present invention has adopted the plastic lens wherein the antifogging coating film is formed on the inner surface of the lens and the hard coating film is formed on the outer surface thereof. Consequently, the formation of the hard coating film before the formation of the antifogging coating film will prevent a backing jig from scratching the lens because of the hard coating film even though the backing jig is brought into contact with the outer surface of the lens when the antifogging coating film is formed.

Therefore, according to the present invention, the adoption of the plastic lens in the vehicle lamp with the antifogging coating film formed on the inner surface of the lens prevents the outer surface of the lens from being damaged when the antifogging coating film is formed.

As the antifogging coating film is formed on the inner surface of the lens in the vehicle lamp according to the present invention, even though the provision of a transparent lens or an equivalent can turn waterdrops sticking onto the inner surface of the lens into a water film because of the surface-active action of the antifogging coating film, whereby the deterioration of quality of the lens arising from making the lens look fogged can be prevented. On the other hand, the formation of the hard coating film on the outer surface of the lens contributes to improving the resistance of the outer surface to scratching, weather and solvent attack.

Although the "lens" may be formed with or without lens elements on its inner surface, the arrangement proposed by the present invention is effective in the latter case because only a few waterdrops sticking onto the inner surface tends to make the lens look fogged.

Each of the lenses in vehicle lamps essentially consist of a lens front portion, a peripheral wall portion formed at the outer peripheral edge of the lens front portion, and a seal leg portion formed at the leading end of the peripheral wall portion, the seal leg portion being fitted and fixed to a lamp body, wherein therein it is desirous to form the antifogging coating film and the hard coating film on at least the lens front portion excluding the seal leg portion.

In other words, it is preferred that the antifogging coating film and the hard coating film should not be formed on the seal leg portion because the antifogging coating and hard coating films sticking onto the seal leg portion hardly smoothly have the lens fitted and fixed to the lamp body. On the other hand, it is preferred that the antifogging coating and hard coating films should be formed on the lens front portion so as not to make at least this portion become fogged and damaged because that portion can be seen from outside in such a state that the lamp has been mounted on the vehicle body.

With respect to the peripheral wall portion then, because it may be seen from the outside while the lamp is mounted on the vehicle body and it is preferred that the antifogging coating and hard coating films have been formed thereon in that case.

However, the lens front portion is formed of transparent lens and a relief is formed on the inner surface of the peripheral wall portion, whereupon the lens 12 will not become fogged even if some waterdrops stick to the inner surface of the peripheral wall portion. Further, the antifogging coating film may be formed in only the lens front portion, whereby the surface onto which the antifogging coating is applied becomes relatively simplified in shape and the antifogging coating area is decreased, which results in simplifying the work of applying the antifogging coating and also reducing the production cost.

By "the lens front portion formed of transparent cover" in this case is meant that the lens front portion is completely made of transparent lens and also that part of the inner surface of the lens front portion is formed of lens elements.

Although it is preferred to form the antifogging coating film on the lens with its inner surface turned upward in view of workability of coating, even the application of the antifogging coating to the lens front portion may cause the coating to be stirred up the lens front portion because of the surrounding peripheral wall portion. If the peripheral wall portion is too high, the coating will stay in the inner space of the peripheral wall portion without escaping outside across the peripheral wall portion. As the antifogging coating contains surface-active agents and is hardly subjected to particle size reduction, the coating staying in the inner space of the peripheral wall portion falls onto the inner surface of the lens front portion and tends to deteriorate quality due to so-called seeding. In order to prevent the seeding, the height of the peripheral wall portion will have to be decreased to a certain extent so that the coating may easily escape outside across the peripheral wall portion. Therefore, the height of the inner surface of the peripheral wall portion is preferably set to 60 mm or less.

According to the present invention, an arrangement to fix the lens to the lamp body is not restrictive but may be made by using, for example, adhesives, sealing members with clips or weld bonding. The lens maybe securely fixed by weld bonding to the lamp body because the lens can be fixed to the lamp body even though the seal leg portion is relatively low with the effect of decreasing the total height of the peripheral wall portion and the seal leg portion. Thus, the deterioration of quality due to the seeding can be effectively prevented. The kind of "weld bonding" is not restrictive but inclusive of, for example, vibration fusion bonding such as ultrasonic fusion bonding, hot plate fusion bonding or the like.

DETAILED DESCRIPTION OF THE PREFERRED EMBODIMENTS

An embodiment of the invention will now be described with reference to the drawings.

Figure 1:
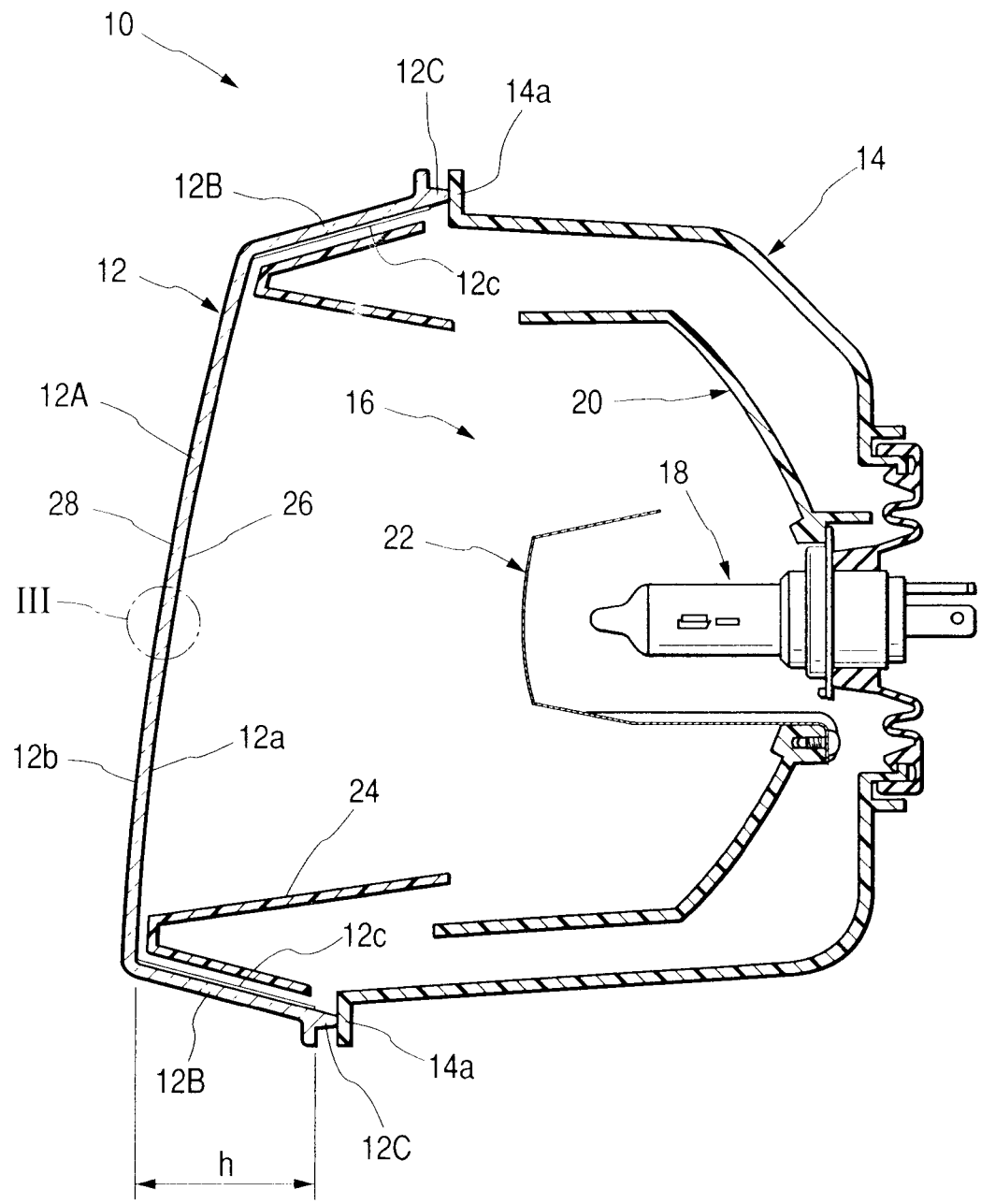
FIG. 1 is a sectional side view of a vehicle lamp embodying the present invention.

FIG. 1 is a sectional side view of a vehicle lamp 10 with respect to an embodiment of the present invention.

As shown in FIG. 1, this vehicle lamp 10 is a headlamp, wherein a reflector unit 16 including a light source bulb 18, a reflector 20 and a shade 22 is provided in a lamp chamber formed with a lens 12 and a lamp body 14 so that the reflector unit 16 may be vertically and laterally tiltable, an extension reflector 24 being provided near the lens 12 in the lamp chamber.

The lens 12 is a plastic lens (made of polycarbonate resin, to be concrete) comprising a transparent lens front portion 12A, a peripheral wall portion 12B formed at the outer peripheral edge of the lens front portion 12A, and a seal leg portion 12C formed at the leading end of the peripheral wall portion 12B. The rear edge face of the seal leg portion 12C of the lens 12 is fitted and fixed by ultrasonic fusion bonding to the front end flange portion 14a of the lamp body 14. The lens 12 is also formed so that the height h of the inner surface 12a of the peripheral wall portion 12B is 60 mm or less even at its highest part.

Further, an antifogging coating film 26 is formed over the whole area of the inner surface 12a of the lens front portion 12A of the lens 12, whereas a relief 12c (e.g., knurl, emboss, satin, etc.) is formed over the whole area of the peripheral wall portion 12B. On the other hand, a hard coating film (a coating film harder than the lens 12) 28 is formed over the whole area of the outer surface 12b of the lens front portion 12A and peripheral wall portion 12B of the lens 12.

The antifogging coating film 26 is to be formed after the hard coating film 28 is formed.

The formation of the hard coating film 28 is carried out through the steps of removing alien substances such as dust sticking to the surface of the lens 12, applying the hard coating film 28 to the outer surface 12b of the lens 12, heating the hard coating film 28 so as to volatilize the solvent contained in the coating and then hardening the synthetic resin composition contained in the paint by irradiating the composition with ultraviolet rays.

Figure 2A:
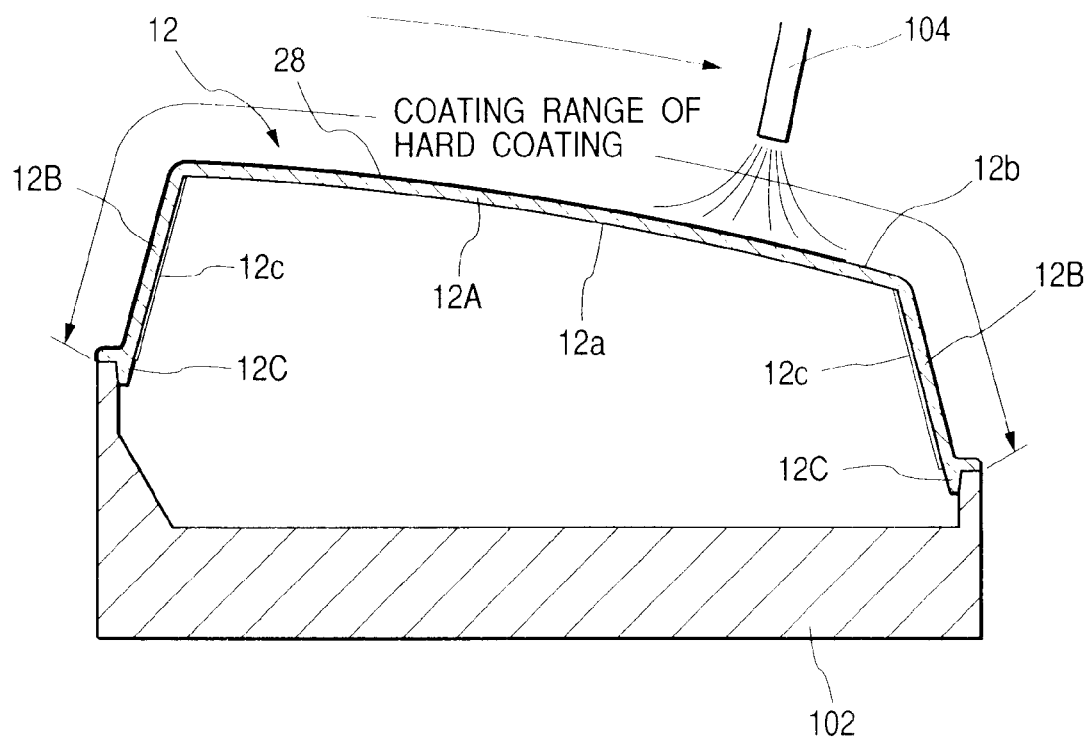
FIG. 2A is a sectional side view showing a condition in which a hard coating film is applied to the outer surface of the lens of the vehicle lamp.

The application of the hard coating film 28 is carried out through the steps of, as shown in FIG. 2A, setting the lens 12 with its outer surface 12b turned upward, moving the nozzle 104 of a spray gun along the outer surface 12b while the seal leg portion 12C is positioned over a backing jig 102 so that the seal leg portion 12C may be brought into contact with the upper end portion of the backing jig 102, and spraying a hard coating from the nozzle 104 onto the outer surface 12b.

Then the nozzle 104 is moved over a wide range of the lens 12 so that the whole area of the outer surface 12b of the lens front portion 12A and peripheral wall portion 12B of the lens 12 may be coated with the hard coating film 28. As the seal leg portion 12C is kept into contact with the backing jig 102 and hidden thereby in that case, the seal leg portion 12C will never be coated with the hard coating film 28.

The hard coating paint essentially consists of an ultraviolet hardening synthetic resin composition and a solvent. As the synthetic resin composition, a polyfunctional acrylate (acrylic) or silicon series, for example, is used.

On the other hand, the formation of the antifogging coating film 26 is carried out by applying the antifogging coating film 26 to the inner surface 12a of the lens 12 after removing alien substances such as dust sticking to the surface of the lens 12 and drying the antifogging coating film 26 by heating.

Figure 2B:
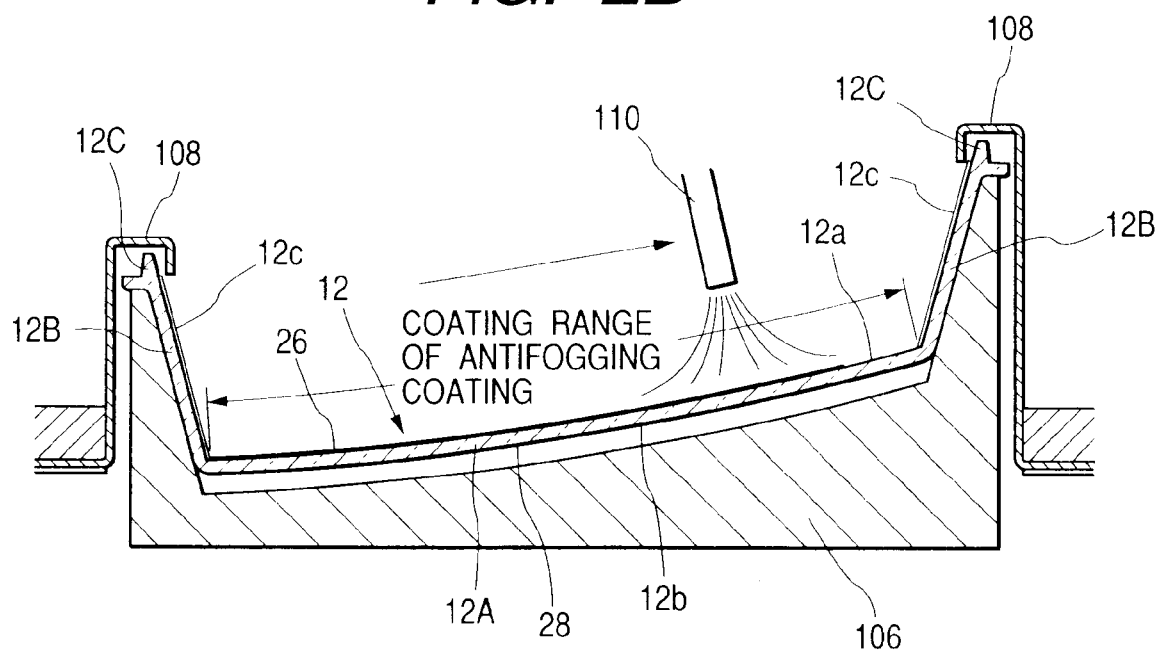
FIG. 2B is a sectional side view showing a condition in which an antifogging coating film is applied to the inner surface of the lens of the vehicle lamp.

The application of the antifogging coating film 26 is carried out through the steps of, as shown in FIG. 2B, setting the lens 12 with its inner surface 12a turned upward, positioning the outer surface 12b over a backing jig 106 so that the outer surface 106 may be brought into partial contact with the recessed portion of the backing jig 106, moving the nozzle 110 of a spray gun along the inner surface 12a of the lens front portion 12A of the lens 12 while the seal leg portion 12C of the lens 12 is covered with a masking jig 108, and spraying an antifogging coating from the nozzle 110 onto the inner surface 12a. The thickness of the antifogging coating film 26 is set at 2–10 μm.

Then the nozzle 110 is only moved over the range needed to apply the coating to the inner surface 12a of the lens front portion 12A. Although the inner surface 12a of the peripheral wall portion 12B may be partially coated with the antifogging coating film 26 at this time, the seal leg portion 12C will never be coated with the antifogging coating film as it is covered with the masking jig 108.

The antifogging coating essentially consists of main, hardening and diluting agents whose workable compounding ratio is set at, for example, 10:1:6–9. The main agent essentially consists of hydrophilic acrylic resin and a surface-active agent, the hydrophilic acrylic resin for use being a compound of a hydrophilic portion with a hydrophobic portion sticking to the inner surface 12a of the lens 12.

Effect of this embodiment of the invention will subsequently be described.

The vehicle lamp 10 according to this embodiment of the invention has adopted the plastic lens 12 wherein the antifogging coating film 26 is formed on the inner surface 12a of the lens front portion 12A. Therefore, the formation of the hard coating film 28 on the outer surface 12b of the lens 12 before the formation of the antifogging coating film 26 prevents the backing jig 106 from scratching the lens 12 due to the hard coating film 28 even though the backing jig 106 is brought into contact with the outer surface 12b of the lens 12 when the antifogging coating film 26 is formed.

Moreover, the formation of the antifogging coating film 26 on the inner surface 12a of the lens front portion 12A makes obtainable the following effect.

Figure 3A:
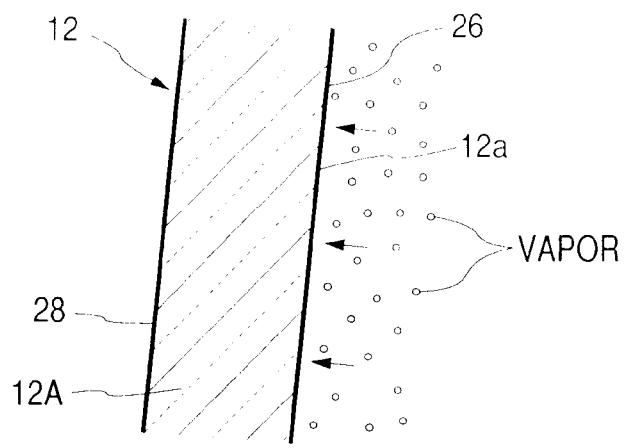
FIG. 3A, 3B, and 3C are detail drawings of a portion III in FIG. 1, explanatory of the significance of forming the antifogging coating film.
Figure 3B:
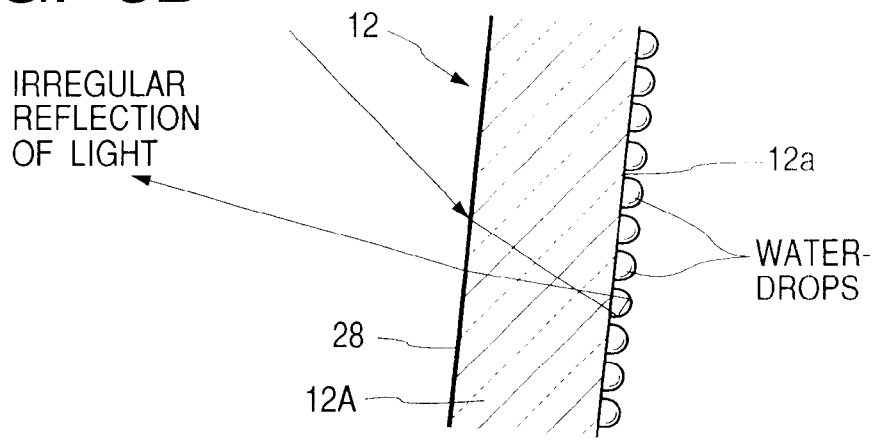
Figure 3C:
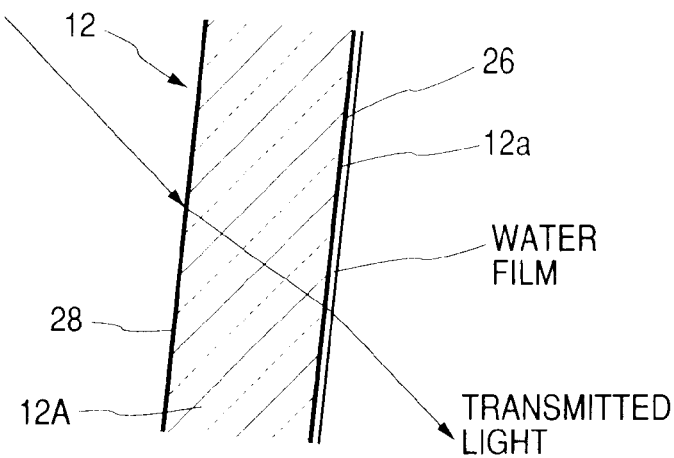
Figure 4:
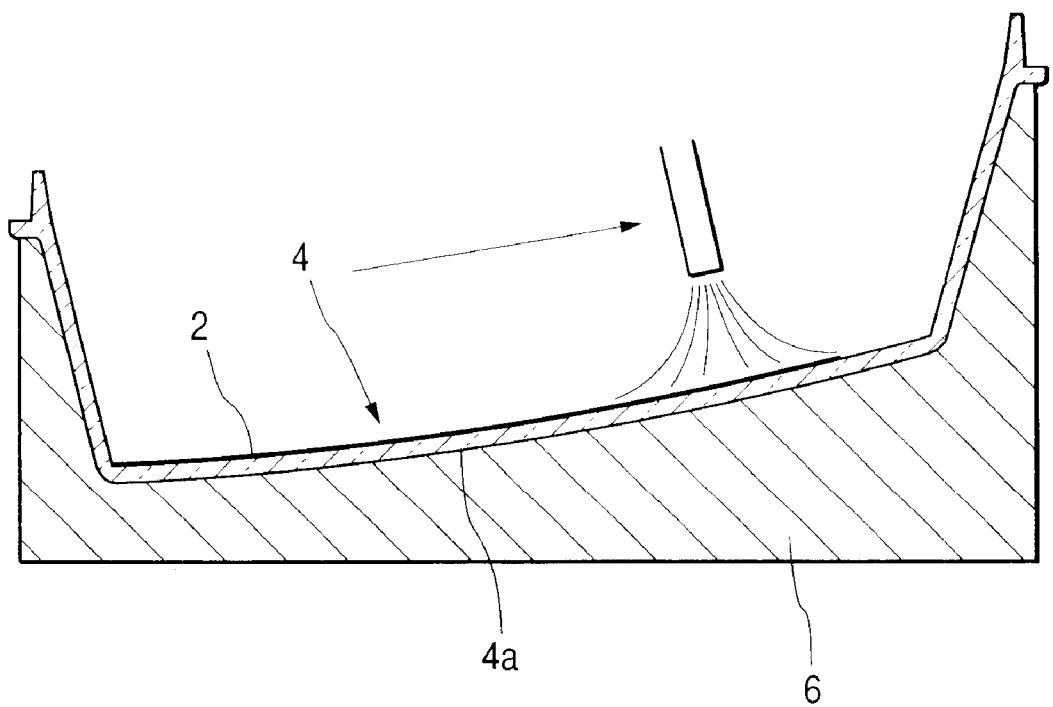
FIG. 4 is a diagram showing a conventional example as is similar to what is shown in FIG. 2B.

As shown in FIG. 3A which is a detail drawing of a portion III in FIG. 1, vapor within the lamp chamber condenses on the inner surface 12a of the lens front portion 12A when the temperature in the lamp chamber becomes lower than that on the outside of the lamp chamber. Supposing that the antifogging coating film 26 is not formed on the inner surface 12a of the lens front portion 12A at that time, the vapor that has condensed on the inner surface 12a produces very small waterdrops as shown in FIG. 3B, whereupon these waterdrops results in irregular reflection of light, thus making the inner surface 12a become fogged. In this embodiment of the invention, however, the vapor that has condensed on the inner surface 12a due to the surface-active action turns into a water film because the antifogging coating film 26 is to be formed on the inner surface 12a of the lens front portion 12A as shown in FIG. 3C. Therefore, the transparent state of the lens front portion 12A is maintained, whereby the lens front portion 12A is prevented from looking foggy, that is, poor in external appearance as quality.

Since the thickness of the antifogging coating film 26 has been set to 10 μm or less, applying the coating to the inner surface 12a a plurality of times is unnecessary and the time of discharging the coating can be shortened. Consequently, it is possible shortening the working time and the time of crosslinking the coating, saving the coating and preventing the coating from dropping.

Further, as the hard coating film 28 is formed on the outer surface 12b of the lens 12, the resistance of the outer surface 12b to scratching, weather and solvent attack can be improved.

As the antifogging coating film 26 and the hard coating film 28 are not formed on the seal leg portion 12C according to this embodiment of the invention, moreover, the lens 12 can be fitted and fixed to the lamp body 14 smoothly.

According to this embodiment of the invention, the antifogging coating film 26 is formed on only the transparent lens front portion 12A, whereas the relief 12c is not formed on the peripheral wall portion 12B but on the inner surface 12a of the peripheral wall portion 12B, whereupon the lens 12 will not become fogged even if some waterdrops stick to the inner surface 12a. As the antifogging coating film 26 is arranged so that it is formed on only the lens front portion 12A, the surface onto which the antifogging coating is applied becomes relatively simplified in shape and the antifogging coating area is decreased, which results in simplifying the work of applying the antifogging coating and also reducing the production cost.

Incidentally, the coating is stirred up the lens front portion 12A because of the surrounding peripheral wall portion 12B as shown in FIG. 2B when the application of the antifogging coating film 26 is carried out with the turned-upward inner surface 12a of the lens 12, even though the antifogging coating film 26 is to be formed on only the lens front portion 12A.

However, the coating thus stirred up can be made to escape outside across the peripheral wall portion 12B as the height of the inner surface 12a of the peripheral wall portion 12B is set relatively as small as 60 mm or less according to this embodiment of the invention. It is therefore possible to prevent the deterioration of quality due to the seeding caused by the falling of the coating remaining in the inner space of the peripheral wall portion 12B onto the inner surface 12a of the lens front portion 12A.

In order to allow the coating stirred up by the peripheral wall portion 12B to escape outside across the peripheral wall portion 12B, decreasing the height of not only the peripheral wall portion 12B of the lens 12 but also the masking jig 108 covering the seal leg portion 12C is effective. However, since the lens 12 is securely fixed to the lamp body 14 by ultrasonic fusion bonding according to this embodiment of the invention, the height of the seal leg portion 12C can be decreased in comparison with a case where a lens is fitted and fixed to a lamp body with an adhesive agent or the like, whereby the deterioration of quality arising from the seeding can effectively be prevented.

Although a case where the vehicle lamp 10 is a headlamp has been described in the aforementioned embodiment of the invention, the same working effect as in the embodiment thereof is achievable by adopting the arrangement stated in the embodiment thereof even in any other vehicle lamp such as fog and beacon lamps.

While only certain embodiment of the invention has been specifically described herein, it will be apparent that numerous modifications may be made thereto without departing from the spirit and scope of the invention.

The present invention is based on Japanese Patent Application No. Hei. 10-359004 which is incorporated herein by reference.

What is claimed is:

1. A vehicle lamp comprising:
   a lens that includes an inner surface on which an antifogging coating film is directly formed and an outer surface on which a hard coating film is directly formed; and
   a lamp body, wherein said lens further comprises:
      a lens front portion;
      a peripheral wall portion formed at the outer peripheral edge of said lens front portion, wherein at least a portion of the peripheral wall includes a relief formed on an inner surface of the peripheral wall; and
      seal leg portion formed at the leading end of said peripheral wall portion and fixed to said lamp body, and wherein the antifogging coating film and the hard coating film are formed on at least said lens front portion excluding said seal leg portion of said lens.

2. The vehicle lamp according to claim 1, wherein said lens front portion is formed of transparent cover, and the antifogging coating film is formed on said lens front portion.

3. The vehicle lamp according to claim 1, wherein the height of the inner surface of said peripheral wall portion is set to 60 mm or less.

4. The vehicle lamp according to claim 3, wherein said lens is securely fixed by weld bonding to said lamp body.

5. The vehicle lamp according to claim 1, wherein the antifogging coating film includes a compound of hydrophilic portion with a hydrophobic portion.

6. The vehicle lamp according to claim 5, wherein the hydrophobic portion of the compound in the antifogging coating film sticks to the inner surface of the lens.

7. The vehicle lamp according to claim 1, wherein the thickness of the antifogging coating film is set at 10 um or less.

8. The vehicle lamp according to claim 1, wherein the lens is made of plastic.

9. A method comprising:

placing a vehicle lens on a jig such that a seal leg portion formed on a leading edge of a peripheral wall portion of the lens contacts the jig to expose an outer surface of the lens;

applying a hard coating film to at least a front portion of the outer surface excluding the seal leg portion;

heating the hard coating film to harden the coating;

placing the seal leg portion on a backing jig to expose an inner surface of the lens; and applying an antifogging coating film to at least a front portion of the inner surface of the lens excluding a relief formed on at least a portion of the inner surface of the peripheral wall portion, and excluding the seal leg portion.

10. The method of claim 9 wherein alien substances are removed from the outer surface of the lens before applying the hard coating film.

11. The method of claim 9 wherein alien substances are removed from the inner surface of the lens before applying the antifogging coating film.

12. The method of claim 9 further comprising applying an antifogging coating film to the outer surface of the lens.

13. The method of claim 9 further comprising weld bonding the lens to a lamp body.

* * * * *